(12) United States Patent
Hyun

(10) Patent No.: US 6,625,011 B2
(45) Date of Patent: Sep. 23, 2003

(54) PORTABLE, FOLDABLE DATA INPUT DEVICE WITH CONICAL HINGE MEANS FOR USE IN A MOBILE COMMUNICATION TERMINAL

(75) Inventor: Sang-Min Hyun, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 11 days.

(21) Appl. No.: 09/971,509

(22) Filed: Oct. 4, 2001

(65) Prior Publication Data
US 2002/0051337 A1 May 2, 2002

(30) Foreign Application Priority Data

Oct. 26, 2000 (KR) .......................................... 2000-63112

(51) Int. Cl.[7] ................................................. G06F 1/16
(52) U.S. Cl. ........................ 361/680; 361/683; 400/88; 400/489; 400/682; D14/347
(58) Field of Search ................................ 361/680, 683, 361/684, 686, 687, 724–727; 400/82, 88, 100, 472, 486, 489, 682; D14/345–347, 388–393; D16/285, 295, 365–369

(56) References Cited

U.S. PATENT DOCUMENTS

| | | | |
|---|---|---|---|
| 5,212,473 A | | 5/1993 | Louis |
| 5,825,612 A | * | 10/1998 | Aubuchon et al. ........... 361/680 |
| 5,905,796 A | | 5/1999 | Jung |
| 5,941,648 A | * | 8/1999 | Robinson et al. ............. 400/82 |
| 5,949,643 A | | 9/1999 | Batio |
| 6,168,331 B1 | * | 1/2001 | Vann ........................... 400/472 |
| 6,239,968 B1 | * | 5/2001 | Kim et al. ................... 361/679 |
| 6,370,018 B1 | * | 4/2002 | Miller et al. ................. 361/680 |
| 6,380,930 B1 | * | 4/2002 | Van Ruymbeke ........... 345/173 |

FOREIGN PATENT DOCUMENTS

EP  1 005 262  5/2000

OTHER PUBLICATIONS

European Search Report dated Apr. 9, 2003, issued in a counterpart application, namely, Appln. No. 01125655.9.

* cited by examiner

Primary Examiner—Darren Schuberg
Assistant Examiner—Anthony Q. Edwards
(74) Attorney, Agent, or Firm—Dilworth & Barrese, LLP

(57) ABSTRACT

A portable, foldable data input device for use with a mobile communication terminal. The data input device includes a first housing having an edge defining a first slope; a second housing having an edge defining a second slope facing the first slope when the first and second housings are unfolded; and conical hinge means situated between the first and second housings, for coupling the first housing to the second housing. The conical hinge means comprises first and second side hinge arms facing each other, mounted on the first housing; and a center hinge arm coaxially interposed between the first and second side hinge arms, the center hinge arm being mounted on the second housing.

10 Claims, 3 Drawing Sheets

PORTABLE, FOLDABLE DATA INPUT DEVICE WITH CONICAL HINGE MEANS FOR USE IN A MOBILE COMMUNICATION TERMINAL

PRIORITY

This application claims priority to an application entitled "Portable, Foldable Data Input Terminal with Conical Hinge Means" filed in the Korean Industrial Property Office on Oct. 26, 2000 and assigned Serial No. 2000-63112, the contents of which are hereby incorporated by reference.

BACKGROUND OF THE INVENTION

1. Field of the Invention

The present invention relates generally to a data input device for use in a mobile communication terminal such as a mobile phone, and in particular, to a portable, foldable data input device with conical hinge means.

2. Description of the Related Art

A keyboard with a plurality of alphanumeric key buttons is typically used as a data input device. In general, the keyboard is connected to a personal computer and used as a data input device. The keyboard includes a plurality of alphanumeric key buttons mounted thereon and generates key data according to depression of the key buttons by the user.

Meanwhile, a mobile communication terminal such as a mobile phone has a keypad or a touch screen as a data input device. The keypad includes a plurality of multi-function key buttons arranged thereon, and the touch screen includes a touch-sensitive panel and an LCD (Liquid Crystal Display) module.

Although the keyboard is very convenient for a complicated data input operation, it is too large in size to carry around. In addition, since the conventional keyboard has a straight structure, it is somewhat inconvenient for the user to use the keyboard in terms of ergonomics and biotechnology, thus fatiguing the wrists of the user. Further, as to the keypad mounted on the mobile communication terminal, it is very inconvenient for the user to perform a complicated data input operation using the keypad, because the keys themselves are small, and the keypad has a small number of multi-function key buttons.

When used as a data input device for inputting simple data (e.g., numeric data for dialing) for voice communication, the keypad is not so inconvenient to use. Recently, however, the mobile communication terminal is frequently used for image communication and Internet communication (including E-mail transfer) as well as voice communication. In particular, many mobile subscribers enjoy a chatting service during the image communication, which is expected to become more popular in the near future. For the Internet communication and the chatting service, the user is required to perform the complicated data input operation at high speed. Therefore, there have been demands for a data input device useful to the complicated data input operation, particularly for mobile communication devices.

SUMMARY OF THE INVENTION

It is, therefore, an object of the present invention to provide a portable, foldable data input device useful for a complicated data input operation.

It is another object of the present invention to provide a portable, foldable data input device using a Bluetooth module.

It is further another object of the present invention to provide a portable, foldable data input device suitable for a high-speed data input operation.

It is yet another object of the present invention to provide a portable, foldable data input device with conical hinge means.

To achieve the above and other objects, there is provided a portable, foldable data input device for use in a mobile communication terminal. The data input device includes a first housing having a first slope; a second housing having a second slope facing the first slope when the first and second housings are unfolded; and conical hinge means situated between the first and second housings, for coupling the first housing to the second housing.

Preferably, the conical hinge means comprises first and second side hinge arms facing each other, mounted on the first housing; and a center hinge arm coaxially interposed between the first and second side hinge arms, the center hinge arm being mounted on the second housing.

Preferably, the first side hinge arm has a truncated cone shape and the second side hinge arm has a cone shape. Preferably, the center hinge arm has a truncated cone shape.

Preferably, the first and second housings each have at least one rubber leg, and each have a plurality of key buttons, as well as being unfolded about the binge means in a V-shape.

Preferably, the first and second housings also have a touch pad, and an LCD (Liquid Crystal Display) module. It is also preferred that an angle given between a hinge axis of the conical hinge means and a reference line is equal to an angle between the first and second slopes and the reference line.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, a portable, foldable data input device with conical hinge means according to the present invention will be applied to a keyboard. The data input device can also be applied to a keypad and a touch screen. In addition, it is contemplated that the present invention can also be applied to a data output device as well as the data input device.

Figure 1:
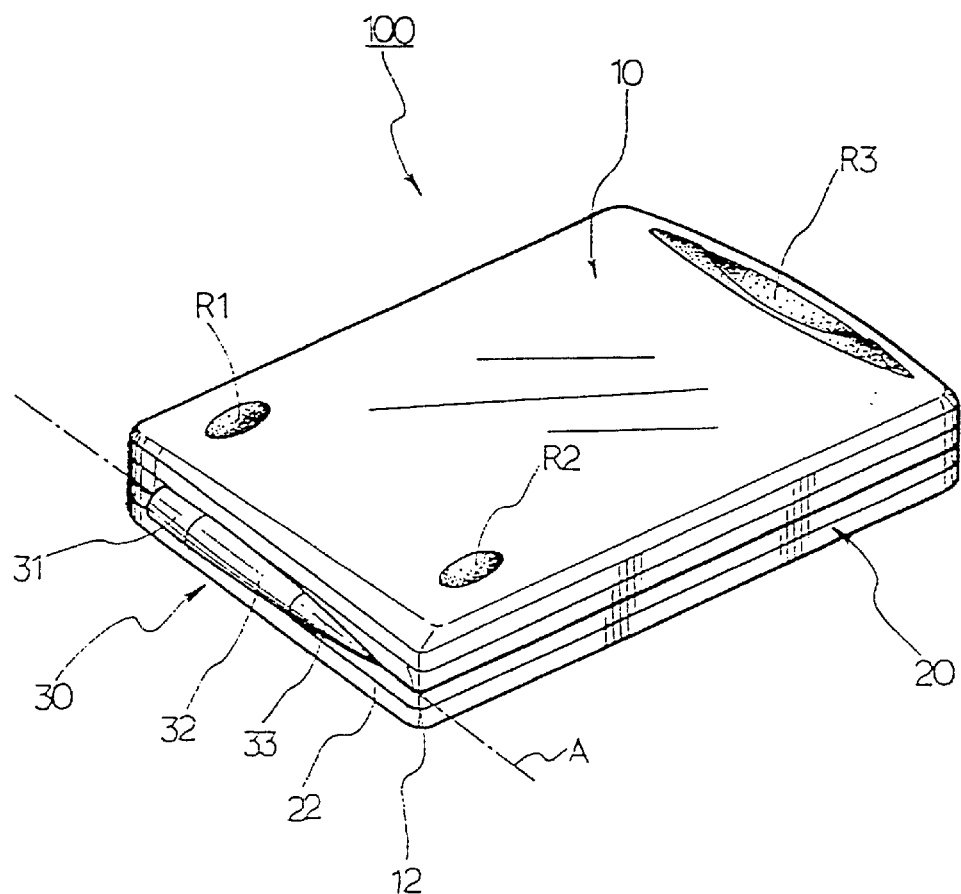
FIG. 1 is a perspective view illustrating a portable, foldable data input device according to an embodiment of the present invention.
Figure 2:
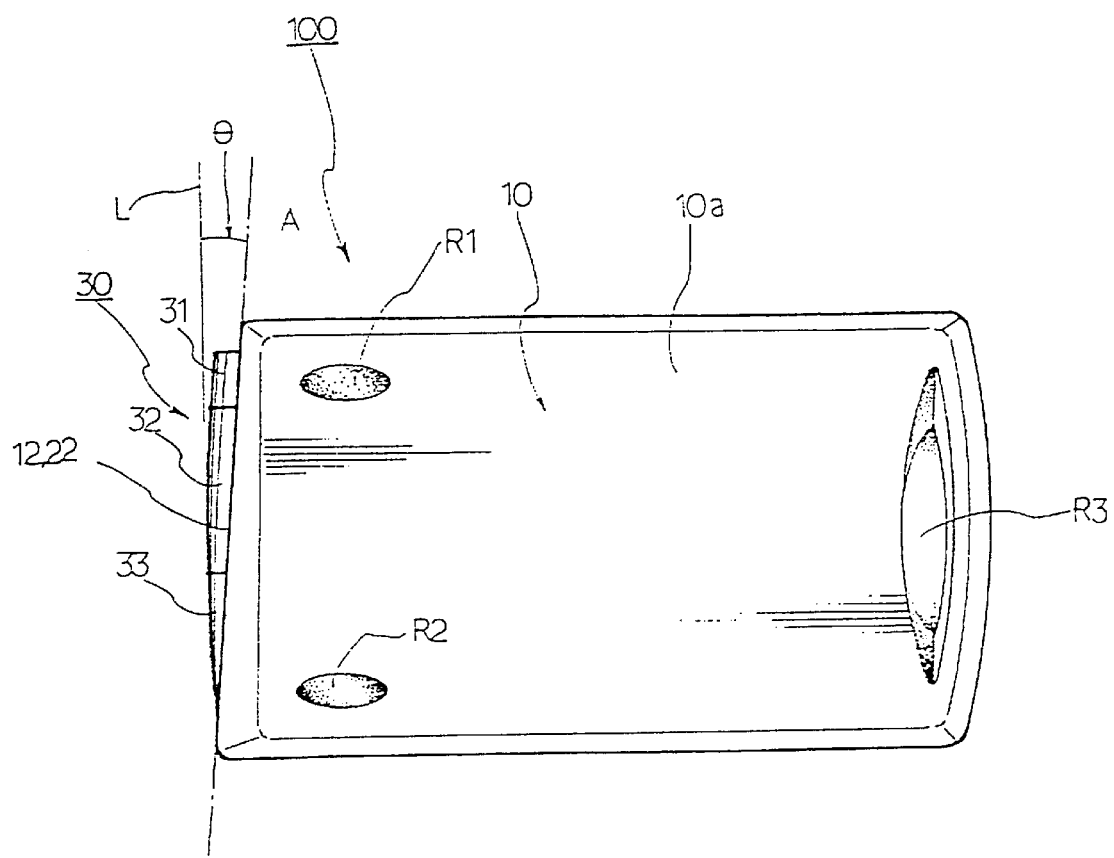
FIG. 2 is a plan view illustrating the portable, foldable data input device according to an embodiment of the present invention.
Figure 3:
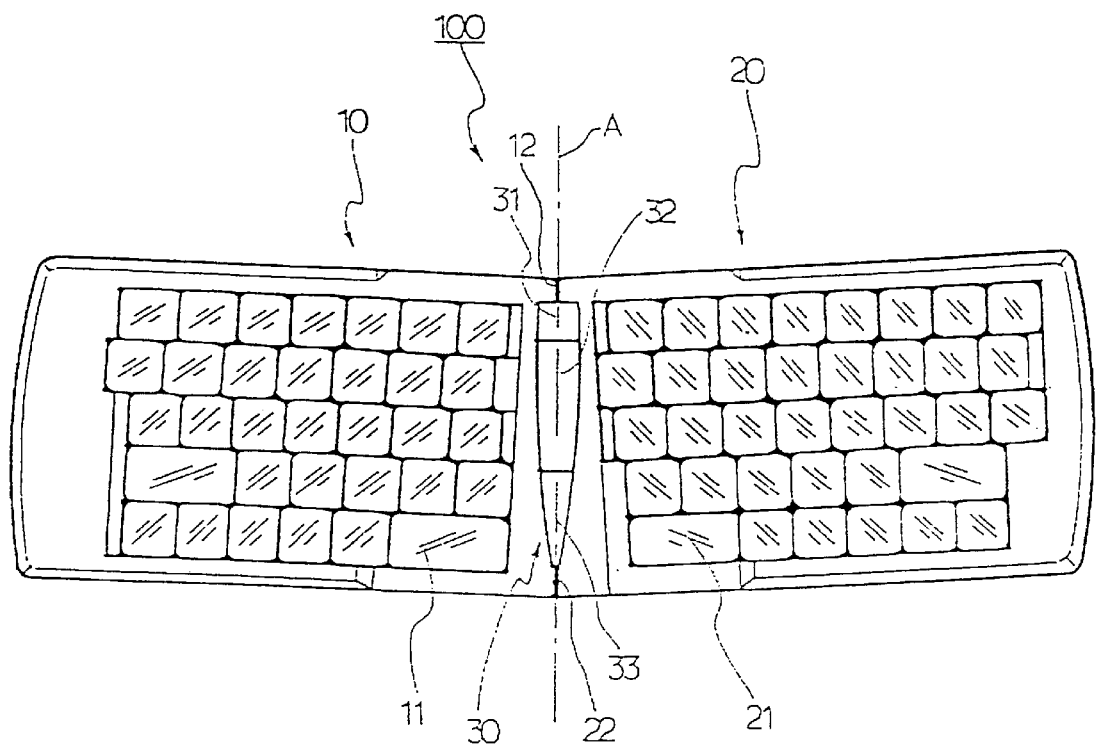
FIG. 3 is a plan view illustrating an unfolded state of the portable, foldable data input device according to an embodiment of the present invention.

FIG. 1 is a perspective view of a portable, foldable keyboard 100 according to an embodiment of the present invention; FIG. 2 is a plan view of the portable, foldable keyboard 100; and FIG. 3 shows an unfolded state of the portable, foldable keyboard 100. Referring to FIGS. 1 to 3, the portable, foldable keyboard 100 includes a first housing 10, a second housing 20, and conical hinge means 30 for mechanically coupling the first housing 10 to the second housing 20. The first housing 10 and the second housing 20 both revolve on a hinge axis A of the conical hinge means 30.

With respect to hinge axis A, first housing 10 has a side adjacent the hinge 30 having a first slope 12 which is inclined at a predetermined angle θ to a reference line L. The second housing 20 has a side adjacent the hinge 30 having a second slope 22 which is also inclined at the same angle θ to the reference line L. An angle given between the hinge axis A of the conical hinge means 30 and the reference line L is equal to the angle between the first and second slopes 12 and 22 and the reference line L. The conical hinge means 30 includes side hinge arms 31 and 33, and a center hinge arm 32 interposed between the side arms 31 and 33. Preferably, the side hinge arms 31 and 33 are mounted on the first housing 10, and the center hinge arm 32 is mounted on the second housing 20. It is also contemplated, however, the side hinge arms 31 and 33 can be mounted on the second housing 20 and the center hinge arm 32 can be mounted on the first housing 10. The side hinge arm 31 mounted on one end of the conical hinge means 30 has a truncated cone shape, and the side hinge arm 33 mounted on another end of the conical hinge means 30 has a cone shape. In addition, the center hinge arm 32 interposed between the side hinge arms 31 and 33 has a truncated cone shape. The conical hinge means 30 according to the present invention includes two side hinge arms 31 and 33 and one center hinge arm 32, by way of example only. As best seen in FIG. 3, the conical hinge permits the keyboard 100 to open in a V-shape, which is ergonomic and reduces the incidence of fatigue in the wrists and hands of the user.

The first and second housings 10 and 20 are both constructed in the form of a flat board. The first housing 10 has a plurality of key buttons 11 arranged thereon, and the second housing 20 also has a plurality of key buttons 21 arranged thereon. As another example, the first and second housings 10 and 20 may have a touch screen in place of the key buttons 11 and 21. As further another example, a selected one of the housings 10 and 20 may have the key buttons, while the other housing has the touch screen. In addition, the present invention can also be applied to a data output device as well as the data input device. In this case, for example, either or both of the first and second housings 10 and 20 may have an LCD module as a data output device.

The first and second housings 10 and 20 each have at least one or more rubber legs R1–R3 to provide a friction force between the housings and a surface upon which the data input device is placed.

Preferably, the data input device is wirelessly connected to a main body of the mobile communication terminal. In the embodiment of the present invention, radio communication between the first and second housings 10 and 20, and radio communication between the housings and the main body of the mobile communication terminal (not shown) are performed by a Bluetooth module, which is typically used for local radio communication. To this end, the first and second housings 10 and 20 include the Bluetooth module. Alternatively, the first housing 10 can be electrically connected to the second housing 20 via the hinge means 30 using a known flexible printed circuit board (PCB). However, it is preferable to wirelessly connect the first housing 10 to the second housing 20 sing the Bluetooth module in order to prevent possible interference which may occur due to rotation of the housings 10 and 20. By connecting the first housing 10 to the second housing 20 using the Bluetooth module, it is possible to easily assemble the data input device. It is also contemplated that keyboard 100 can be connected by wire to the mobile communication terminal.

The user may fold the keyboard 100 to carry it in a pocket or a bag, since the keyboard 100 occupies a small space when folded. In addition, since the keyboard 100 according to the present invention preferably employs the Bluetooth module, it is possible for the user to use the keyboard 100 at a distance from the main body of the mobile communication terminal.

As described above, the first and second housings having the slopes facing each other are coupled using the conical hinge means, so that it is possible to unfold the keyboard in the V-shape, thus making it possible for the user to use the keyboard conveniently in terms of ergonomics and biotechnology. Further, the user can carry the keyboard by folding it. Therefore, the novel keyboard is suitable for the complicated data input operation required in the mobile communication terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable, foldable data input device for use with a mobile communication terminal, the device comprising:
   a first housing having an edge defining a first slope;
   a second housing having an edge defining a second slope facing the first slope when the first and second housings are unfolded; and
   a conical hinge situated between the first and second housings, for coupling the first housing to the second housing, wherein an angle between a hinge axis of the conical hinge and a reference line is equal to an angle between the first and second slopes and the reference line.

2. The portable, foldable data input device as claimed in claim 1, wherein the conical hinge means comprises:
   first and second side hinge arms facing each other, mounted on the first housing; and
   a center hinge arm coaxially interposed between the first and second side hinge arms, the center hinge arm being mounted on the second housing.

3. The portable, foldable data input device as claimed in claim 2, wherein the first side hinge arm has a truncated cone shape and the second side hinge arm has a cone shape.

4. The portable, foldable data input device as claimed in claim 3, wherein the center hinge arm has a truncated cone shape.

5. The portable, foldable data input device as claimed in claim 1, wherein the first and second housings each have at least one rubber leg.

6. The portable, foldable data input device as claimed in claim 1, wherein the first and second housings each have a plurality of key buttons.

7. The portable, foldable data input device as claimed in claim 1, wherein the first and second housings are unfolded about the hinge means in a V-shape.

8. The portable, foldable data input device as claimed in claim 1, wherein the first and second housings have a touch pad.

9. The portable, foldable data input device as claimed in claim 1, wherein the first and second housings have an LCD (Liquid Crystal Display) module.

10. The portable, foldable data input device as claimed in claim 1, wherein the first and second housings are constructed in a form of a flat board.

* * * * *